US012562681B2

(12) United States Patent
    Lin

(10) Patent No.: US 12,562,681 B2
(45) Date of Patent: Feb. 24, 2026

(54) SOLAR ENERGY STORAGE AND GENERATION SYSTEM

(71) Applicant: WINNER TECHNOLOGY CO., LTD., Toufen (TW)

(72) Inventor: Chih-Shen Lin, Toufen (TW)

(73) Assignee: WINNER TECHNOLOGY CO., LTD., Toufen (TW)

( * ) Notice: Subject to any disclaimer, the term of this patent is extended or adjusted under 35 U.S.C. 154(b) by 0 days.

(21) Appl. No.: 18/701,090

(22) PCT Filed: Oct. 13, 2022

(86) PCT No.: PCT/CN2022/125028
    § 371 (c)(1),
    (2) Date: Apr. 12, 2024

(87) PCT Pub. No.: WO2023/061426
    PCT Pub. Date: Apr. 20, 2023

(65) Prior Publication Data
    US 2024/0348203 A1     Oct. 17, 2024

(30) Foreign Application Priority Data
    Oct. 14, 2021     (CN) .......................... 202111197780.X

(51) Int. Cl.
    *H02S 40/44*        (2014.01)
    *H02S 40/22*        (2014.01)
    *H02S 20/32*        (2014.01)
(52) U.S. Cl.
    CPC .............. *H02S 40/44* (2014.12); *H02S 40/22* (2014.12); *H02S 20/32* (2014.12)

(58) Field of Classification Search
    CPC .......... H02S 40/44; H02S 40/22; H02S 20/32; F24S 10/40; F24S 23/30; F24S 23/70; F24S 50/20; F24S 60/30; F24S 80/60
    See application file for complete search history.

(56) References Cited

U.S. PATENT DOCUMENTS 8,113,193  B2 *   2/2012   Glynn ..................... F03G 6/061
                                                        126/572
9,624,911  B1 *   4/2017   Griffith ................... F24S 23/74
                 (Continued)

FOREIGN PATENT DOCUMENTS

CH           635417 A5      3/1983
CN        201412975 Y       2/2010
                 (Continued)

OTHER PUBLICATIONS

Translation of CN-204848256-U (Year: 2025).*

*Primary Examiner* — Angelo Trivisonno
(74) *Attorney, Agent, or Firm* — MUNCY, GEISSLER, OLDS & LOWE, P.C.

(57)                 ABSTRACT
A solar energy storage and generation system includes a housing mounted on a base, a solar collector installed inside the housing, at least one lens installed on the upper surface of the housing, and multiple liquid-level counterbalance devices installed separately at different corner positions inside the housing. The base includes a multi-axis adjustment device positioned corresponding to the center of gravity of the counterweights in the housing. By installing the liquid-level counterbalance devices inside the housing and the multi-axis adjustment device, the upper surface of the housing can be adjusted to face the direction of the sun, thereby achieving a sun-tracking effect.

8 Claims, 9 Drawing Sheets

(56) References Cited

U.S. PATENT DOCUMENTS

| | | | | |
|---|---|---|---|---|
| 2003/0172922 | A1* | 9/2003 | Haber ..................... | H02S 20/10 |
| | | | | 126/607 |
| 2010/0212654 | A1* | 8/2010 | Alejo Trevijano ..... | H02S 40/22 |
| | | | | 29/726 |
| 2010/0229916 | A1* | 9/2010 | Bechamp ................ | H02S 40/00 |
| | | | | 135/121 |

FOREIGN PATENT DOCUMENTS

| | | | | |
|---|---|---|---|---|
| CN | 204848256 | U | * | 12/2015 |
| CN | 109462003 | A | | 3/2019 |
| CN | 109672398 | A | | 4/2019 |
| CN | 210920766 | U | | 7/2020 |

* cited by examiner

52

51

SOLAR ENERGY STORAGE AND GENERATION SYSTEM

This application claims priority to Chinese patent application No. 202111197780.X, entitled "Solar Energy Storage and Generation System", filed with the China National Intellectual Property Administration on Oct. 14, 2021, the entire contents of which are incorporated herein by reference.

FIELD OF INVENTION

The present invention relates to solar thermal power generation, particularly a concentrated solar energy storage and power generation system that can improve the utilization rate of sunlight and achieve miniaturization.

BACKGROUND OF THE INVENTION

Concentrated Solar Power (CSP) has been in development for decades, yet widespread adoption remains elusive. One contributing factor is the relatively low utilization rate of solar energy collection and conversion. In addition to dispersion and losses between the reflector and receiver, energy is lost through reflection of the light energy received during conversion or saturation, while the receiver may also suffer significant convective heat loss when exposed to the atmosphere. In addition, the manufacturing complexities and costs associated with large-scale, high-temperature power generation units can limit operating temperatures and notably impact conversion efficiency. Meanwhile, installation requires a significant amount of space, and in the event of a fire, immediate shutdown and extinguishing of solar power is not feasible, making it impractical for urban environments. This also increases the cost of power transmission and poses a risk to birds and the environment due to high temperature light emissions.

SUMMARY OF THE INVENTION

Based on the aforementioned shortcomings, the purpose of the present invention is to provide a solar energy storage and generation system, particularly a concentrated solar energy storage and power generation system, which can improve the utilization rate of sunlight and achieve miniaturization.

In order to achieve the above purpose, the solar energy storage and generation system provided by the present invention comprises a housing mounted on a base, a solar collector installed inside the housing, and at least one lens installed on the upper surface of the housing. The housing is a hollow body having multiple liquid-level counterbalance devices separately installed at different corner positions inside the housing.

Preferably, the system further comprises at least one light path mechanism correspondingly disposed between the at least one lens and the solar collector for collecting the light incident on the at least one lens. The light path mechanism may be a light guide mirror assembly or a light guide tube assembly.

Preferably, the system comprises a multi-axis adjustment device mounted on the base and corresponding to the center of gravity of the housing.

Preferably, the interior of the housing is a vacuum chamber.

Preferably, a thermal energy storage tank is installed inside the housing and is connected to a thermal conduction device of the solar collector. The thermal energy storage tank has an outlet pipe and an inlet pipe penetrating through a side surface of the housing.

Preferably, the liquid-level counterbalance device has a liquid-level adjustment controller for introducing liquid from an external water source into the liquid-level counterbalance device or discharging liquid from the liquid-level counterbalance device into a liquid storage tank.

Preferably, the system comprises a retractable shade installed on the housing for covering the upper surface of the housing, and a cleaning device is installed between the retractable shade and the housing.

Preferably, the solar collector comprises an absorber which is a hollow chamber.

REFERENCE NUMERALS

Figure 1:
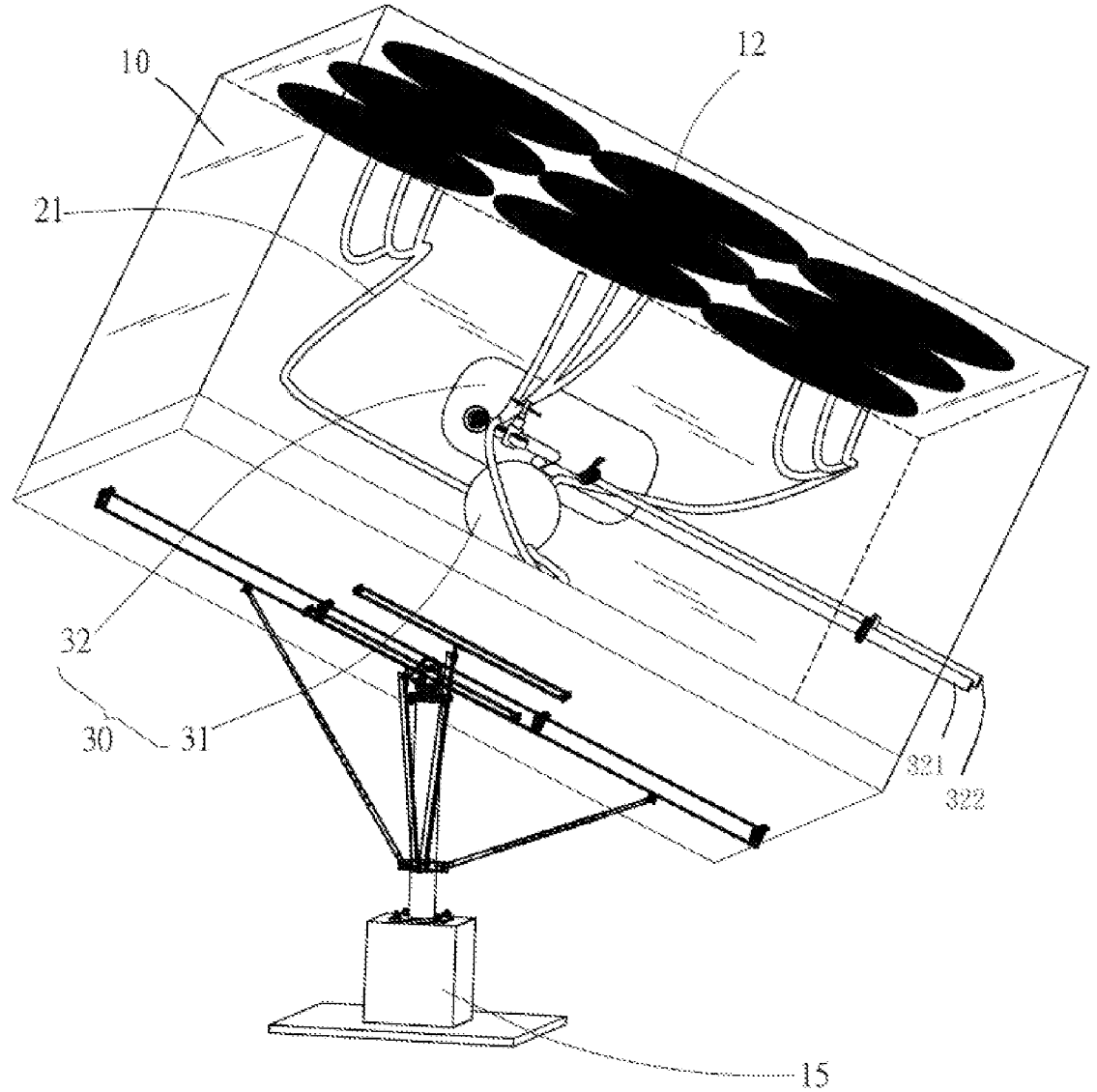
FIG. 1 is a schematic diagram of a first embodiment of the present invention.

10: Housing
12: Lens
15: Base
151: Multi-axis adjustment device
21: Light guide tube
21*a*: Reflecting layer
21*b*: Insulating layer
30: Solar collector
31, 41: Absorber
32: Thermal energy storage tank
321: Outlet pipe
322: Inlet pipe
42: Thermal conduction trough
43: Thermal conduction device
44: Thermoelectric module
50: Retractable shade
51: Sprayer
52: Roller brush
61: Focusing lens
62: Reflector
63: Focal length conversion lens
70: Liquid-level counterbalance device
72: External water source
74: Liquid storage tank
L: Light ray

DETAILED DESCRIPTION OF THE PREFERRED EMBODIMENTS

In order to clearly explain the specific embodiments, structures, and effects achieved by the present invention, the following description is made with reference to the accompanying drawings:

Referring to FIGS. 1 to 4, a solar energy system is shown comprising a housing 10 mounted on a base 15. The housing 10 is a rectangular enclosure. The solar energy system includes a solar collector 30 installed within the housing 10, at least one lens 12 installed on the upper surface of the housing 10, the lens 12 preferably being a Fresnel lens and having a light absorption rate of less than 5%, and at least one light path mechanism correspondingly disposed between the at least one lens 12 and the solar collector 30 for collecting the light rays L incident on the at least one lens 12. The light path mechanism is spaced from the at least one lens 12. Wherein the interior of the housing 10 is a vacuum chamber for reducing light loss and achieving insulation.

In a first and a second embodiment of the present invention, the solar collector 30 includes an absorber 31 connected to a thermal energy storage tank 32. The absorber 31 is a hollow spherical chamber, and its inner surface has an absorbing layer (not shown) capable of achieving at least 95% light absorption. When light rays L enter the interior of the absorber 31, they are repeatedly reflected and converted into thermal energy. The material of the absorbing layer may be, but is not limited to, graphite, tungsten carbide, carbon nanotubes, or nanomaterials. In other embodiments, the solar collector 30 is not limited to the aforementioned structure and may be any form of solar collector 30.

Figure 2:
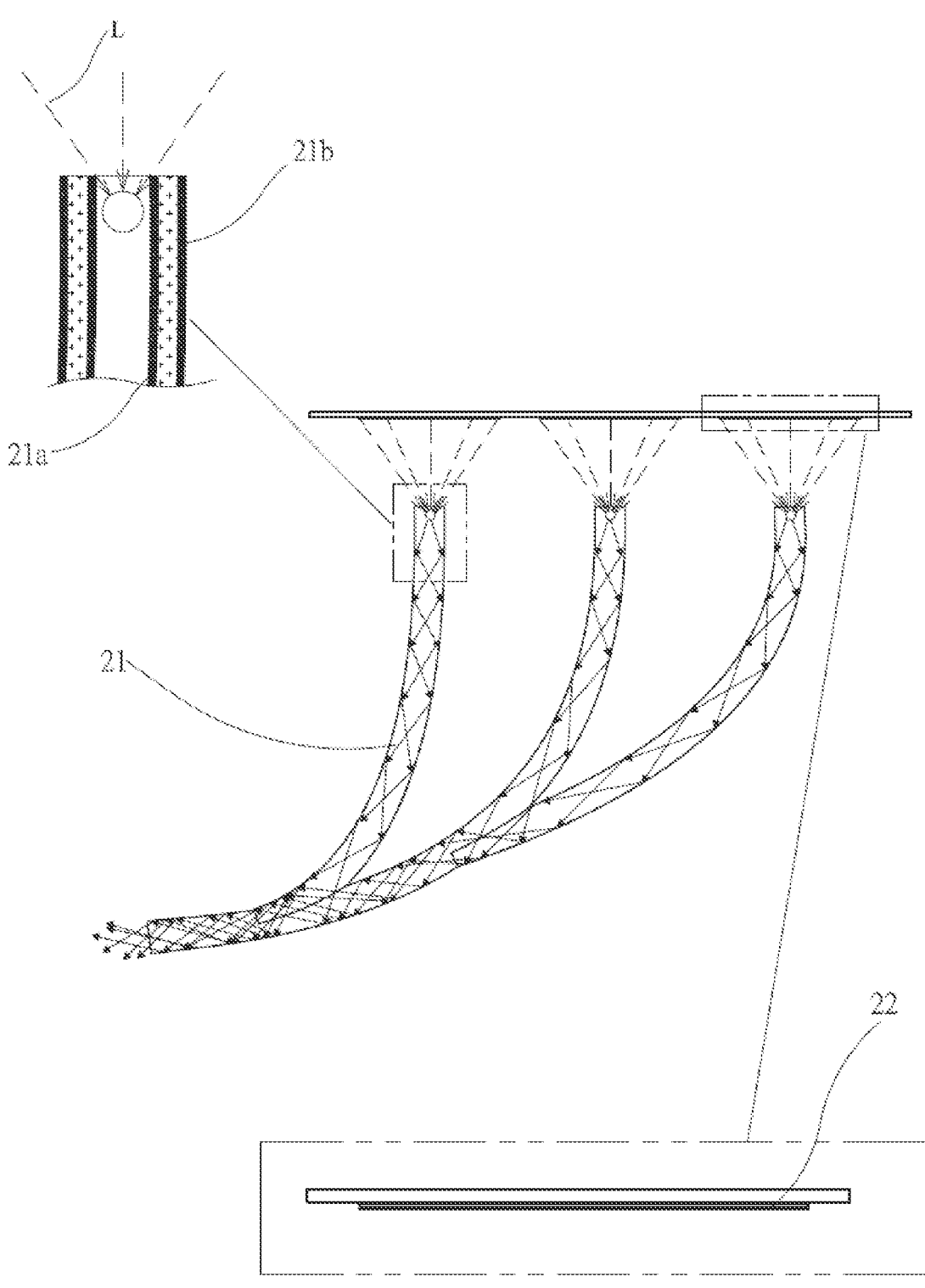
FIG. 2 is a light path diagram of the first embodiment of the present invention.

Referring to FIGS. 1 and 2, which illustrate the first embodiment of the present invention, the multiple lenses 12 are installed on the upper surface of the housing 10. The light path mechanism is a light guide tube assembly comprising multiple spaced light guide tubes 21. The portion of each light guide tube 21 near the upper surface of the housing 10 is composed of multiple spaced tubes. One end of the light guide tube assembly is connected to the absorber 31 of the solar collector 30, and the other end is spaced apart from the lens 12 by a distance approximately equal to the focal length of the lens 12, thereby reducing the inner diameter of the light guide tube 21.

In the first embodiment, a reflecting layer 21a is arranged on the inner surface of the light guide tube 21 to receive the light rays L reflected from the lens 12, and an insulating layer 21b is arranged on the outer surface of the light guide tube 21. The insulating layer 21b has characteristics of low thermal conductivity, low radiation loss, and high-temperature resistance. The material of the insulating layer 21b may be, but is not limited to, zirconia, diatomaceous earth, ceramic wool, porous composites, or nanomaterials.

In practical use, the housing 10 can be mounted on the base 15 with the solar collector 30 installed inside the housing 10. The solar collector 30 has the absorber 31 connected to the thermal energy storage tank 32, which has an outlet pipe 321 and an inlet pipe 322 penetrating through a side surface of the housing 10, and external liquid enters the thermal energy storage tank 32 through the inlet pipe 322. When the thermal energy storage tank 32 contacts the absorber 31 of the solar collector 30, the temperature of the absorber 31 is transferred to the thermal energy storage tank 32, causing the liquid in the thermal energy storage tank 32 to heat up and evaporate. The gas then flows out through the outlet pipe 321 to a power generation device (not shown) and drives the power generation device to generate electricity by fluid kinetic energy or can be used for seawater desalination or steam reforming to produce hydrogen, among other applications.

Referring to FIG. 2, which shows the light path within the light guide tube 21, in the first embodiment, the upper surface of the housing 10 is oriented toward the sun. The light rays L are refracted and focused by the lens 12 into the light guide tube 21, and undergo multiple reflections by the reflecting layer 21a before entering the interior of the absorber 31 of the solar collector 30. At this point, the light rays L contact the absorbing layer of the absorber 31 and continue to undergo multiple reflections inside the absorber 31 while the absorbing layer converts the light rays L into thermal energy. The absorber 31 conducts the thermal energy to the thermal energy storage tank 32, which then transfers the thermal energy through the outlet pipe 321 to external facilities for applications such as heating water in a storage tank for hot water use. In this embodiment, the direct contact between the absorber 31 and the thermal energy storage tank 32 reduces heat loss during the thermal energy transfer process.

Figure 3:
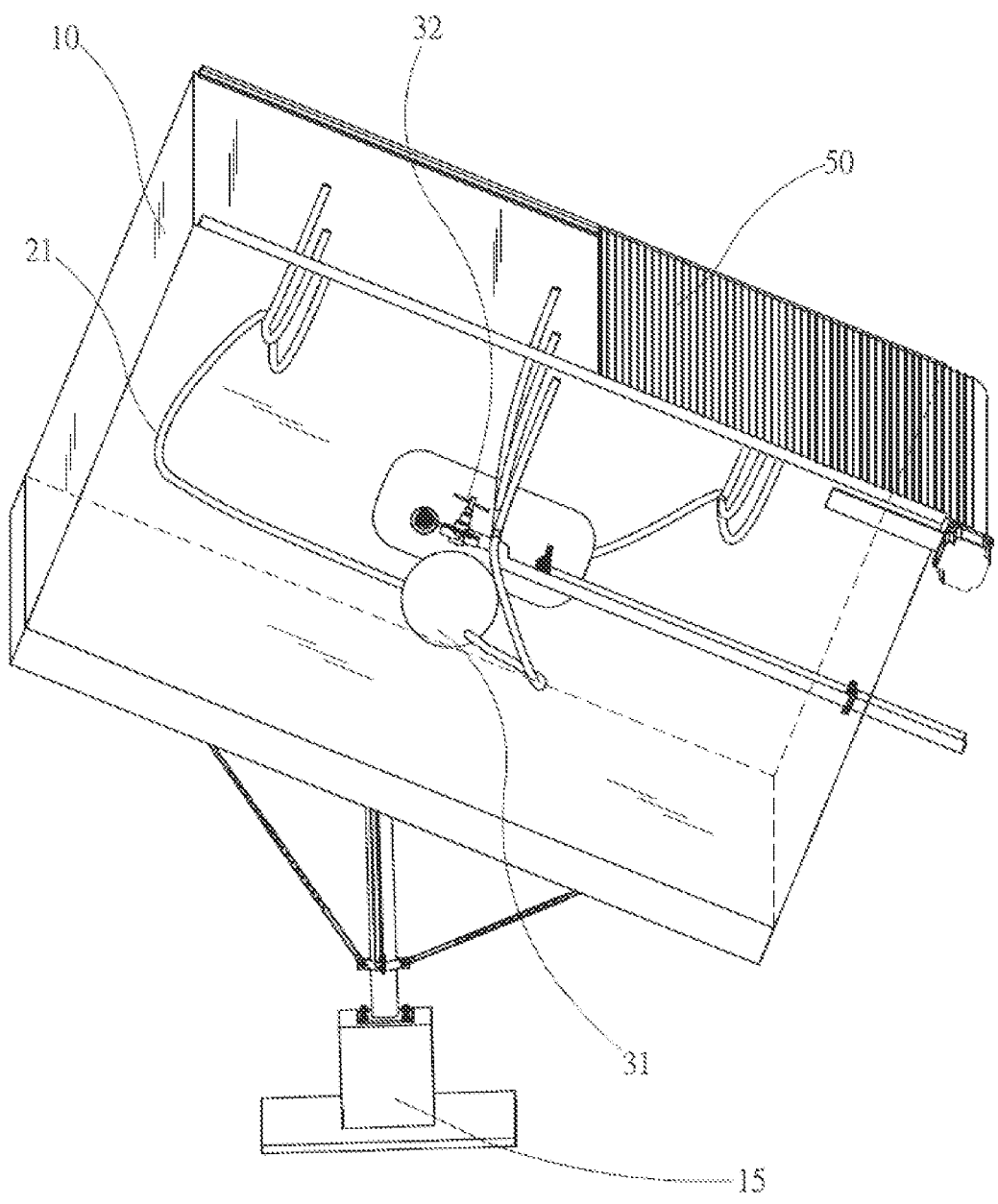
FIG. 3 is a schematic diagram of a second embodiment of the present invention.
Figure 4:
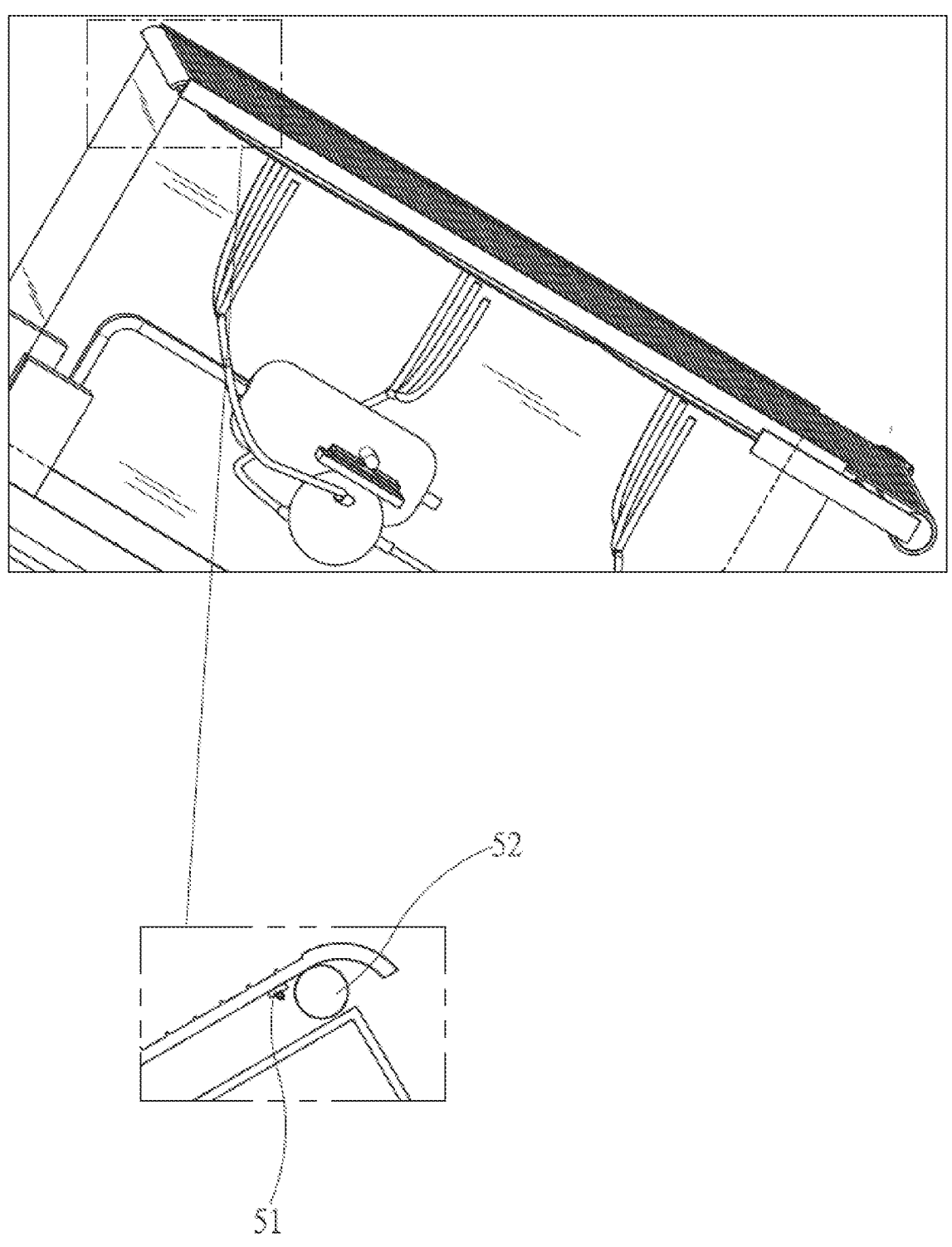
FIG. 4 is a schematic diagram of the cleaning device in the second embodiment of the present invention.

Referring to FIGS. 3 and 4, which illustrate the second embodiment of the present invention, the upper surface of the housing 10 is also provided with a retractable shade 50 that can cover the upper surface of the housing 10. When the solar collector 30 is malfunctioning or temporarily out of use, the retractable shade 50 can be used to block sunlight and prevent heat generation. In addition, a cleaning device is also installed between the retractable shade 50 and the upper surface of the housing 10. The cleaning device may be a roller brush 52 and/or a sprayer 51. When the solar collector 30 is malfunctioning or temporarily out of use, the retractable shade 50 can be pulled up to cover the upper surface of the housing 10, not only to block sunlight and prevent the solar collector 30 from being burned, but also to protect the housing 10 from damage caused by sand, hail, or other foreign objects. Moreover, as the retractable shade 50 is raised or lowered, it also cleans the surface of the housing 10. The winding direction of the retractable shade 50 is downward, so that any foreign objects on the retractable shade 50 fall due to gravity during the winding process, thereby achieving a self-cleaning effect.

Figure 5:
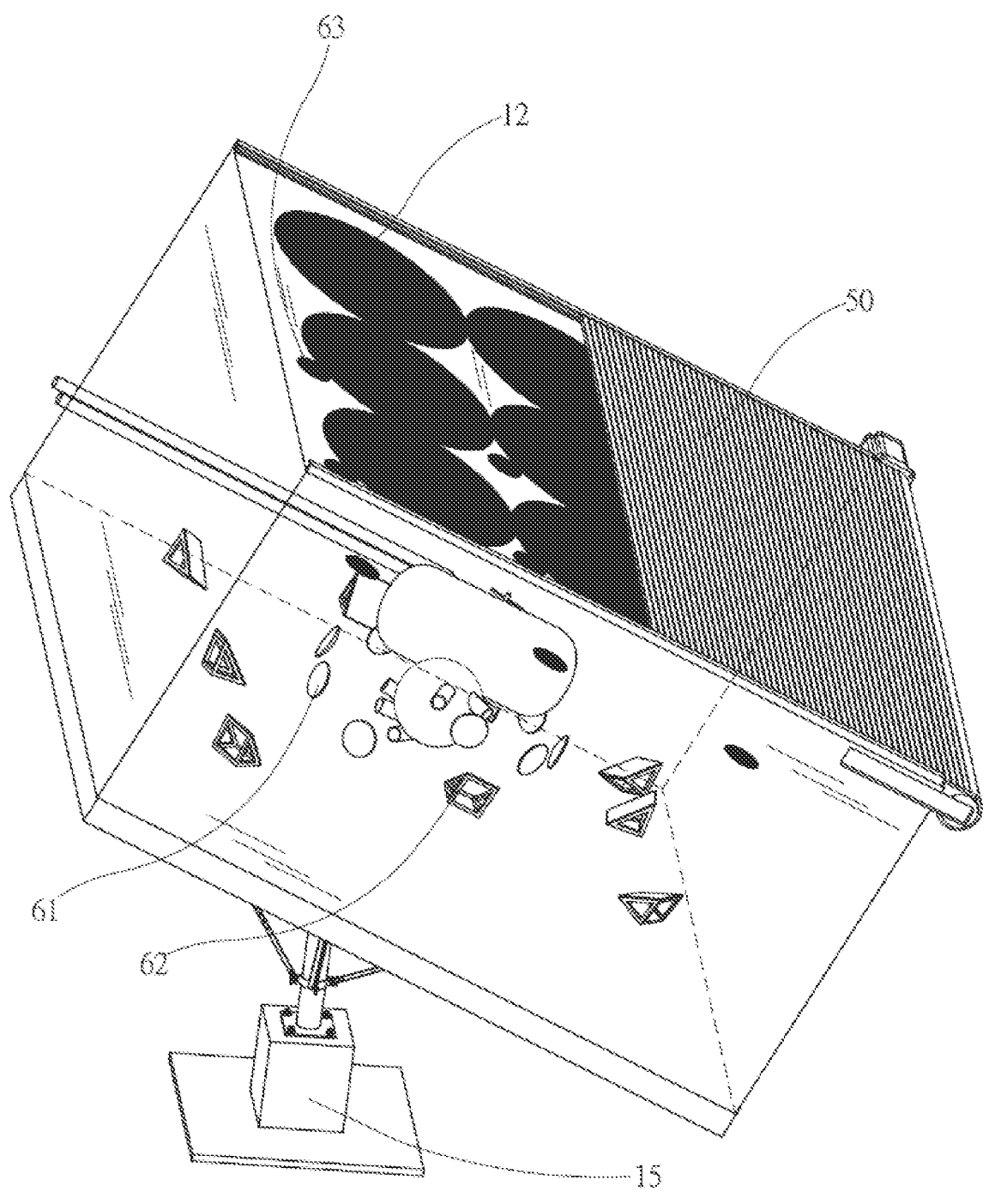
FIG. 5 is a schematic diagram of a third embodiment of the present invention.

Referring to FIG. 5, which illustrates a third embodiment of the present invention, in this embodiment, the multiple lenses 12 are installed on the upper surface of the housing 10, and the light path mechanism is a light guide mirror assembly. The light path between each lens 12 and the solar collector 30 sequentially comprises at least one focal length conversion lens 63, at least one reflector 62, and at least one focusing lens 61 installed inside the housing 10. The focal length conversion lens 63 is positioned relatively closer to the lens 12, the focusing lens 61 is positioned relatively closer to the solar collector 30, and the reflector 62 is positioned between the focal length conversion lens 63 and the focusing lens 61. As a result, high, medium, and low temperature zones are formed between the absorber 31, the light path mechanism, and the lens 12, allowing for more effective selection of light-collecting materials to reduce costs.

Figure 6:
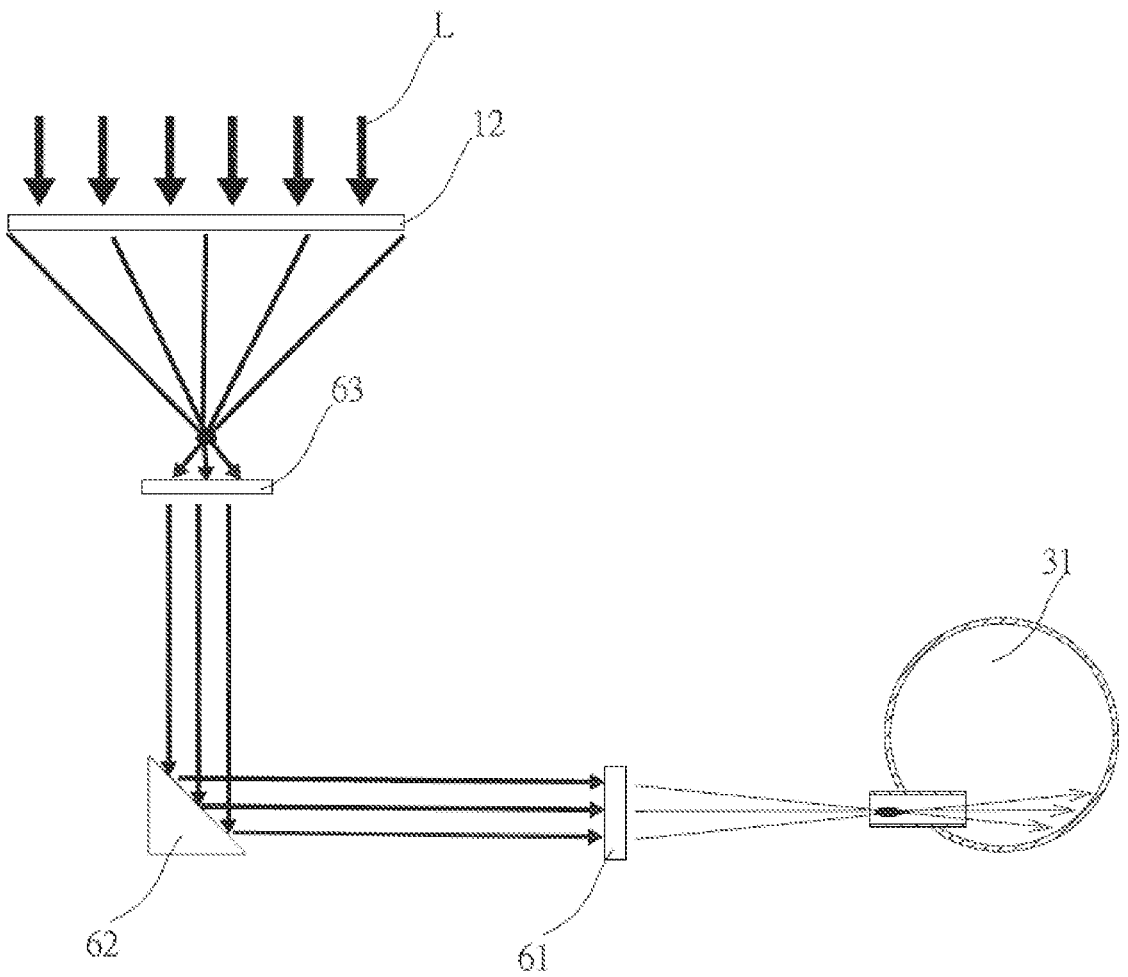
FIG. 6 is a light path diagram of the third embodiment of the present invention.

Referring to FIG. 6, which illustrates the light path of the light rays L through the light path mechanism and into the solar collector. When the light rays L are refracted through the lens 12 and enter the housing 10, they are refracted by the focal length conversion lens 63 toward the reflector 62, reflected by the reflector 62 toward the focusing lens 61, and then focused by the focusing lens 61 into the absorber 31. The light rays L are repeatedly reflected and absorbed within the solar collector 30, generating thermal energy which is conducted by the absorber 31 to the thermal energy storage tank 32 and then transferred through the outlet pipe 321 to external facilities for applications such as heating water in a storage tank for hot water use.

Figure 7:
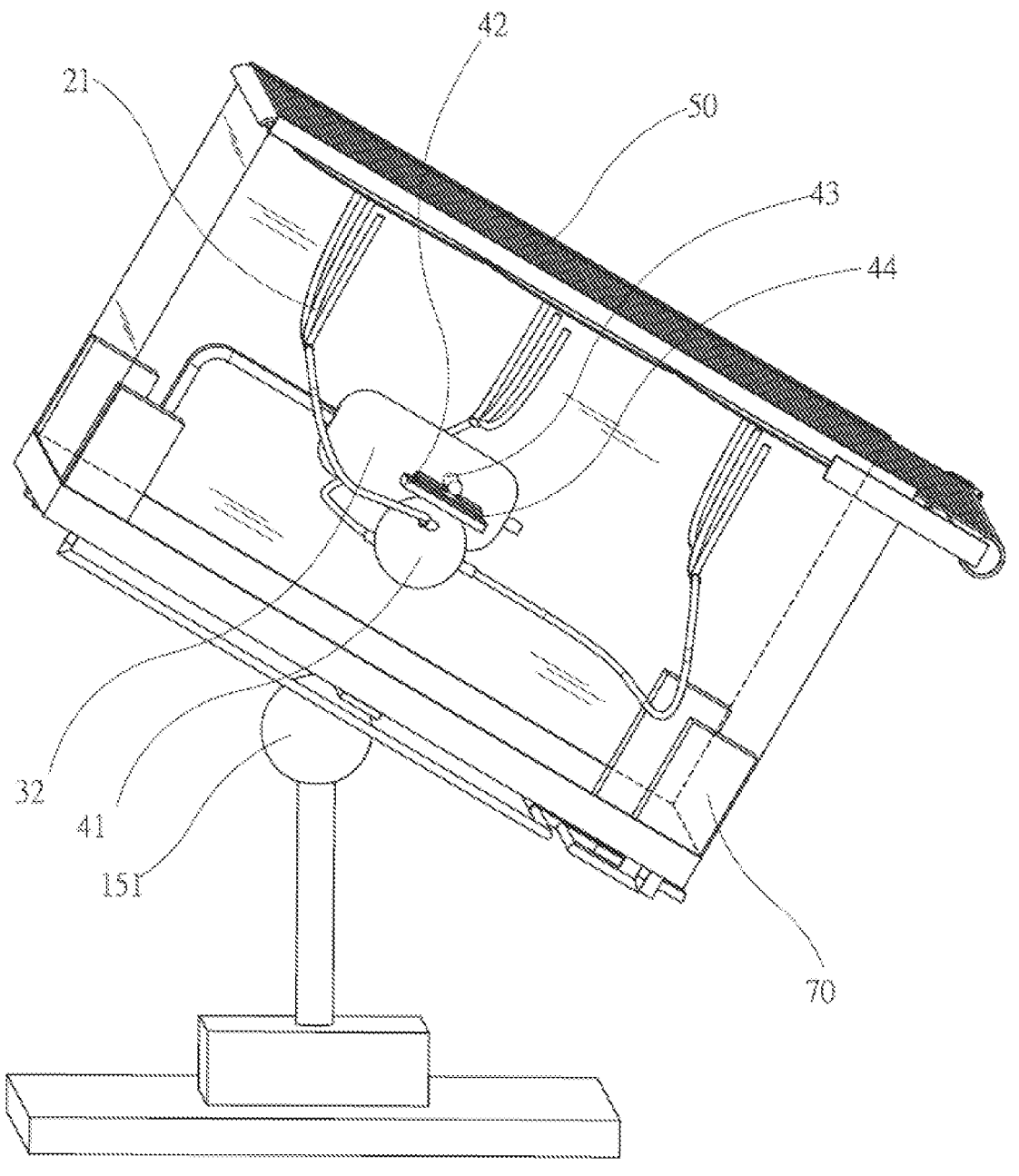
FIG. 7 is a schematic diagram of a fourth embodiment of the present invention.
Figure 8:
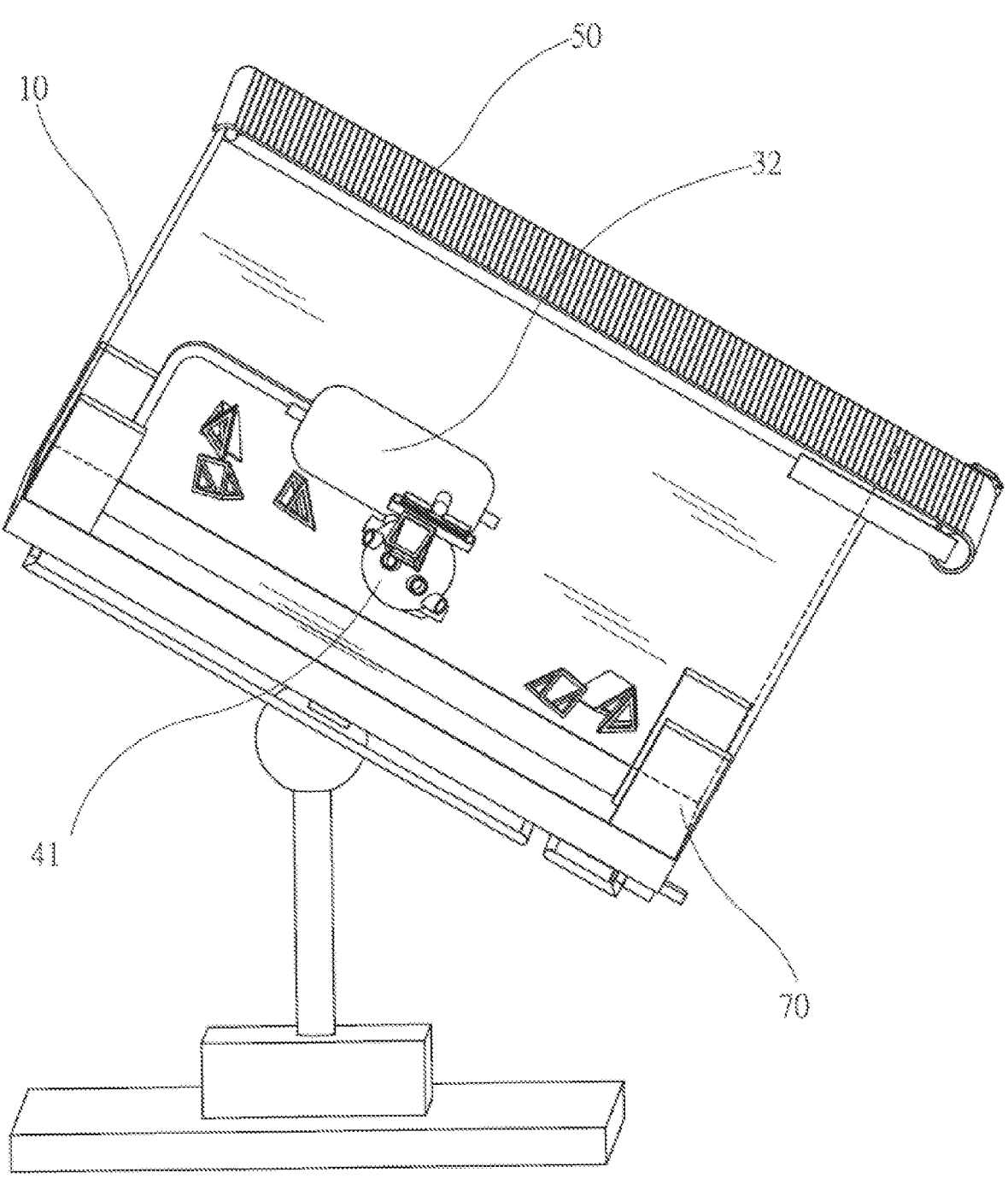
FIG. 8 is a schematic diagram of a fifth embodiment of the present invention.

Referring to FIGS. 7 and 8, which illustrate a fourth and a fifth embodiment of the present invention. In these embodiments, the solar collector 30 comprises an absorber 41 connected to a thermal conduction trough 42, a thermal conduction device 43 installed in the thermal conduction trough 42, which may be, but is not limited to, a heat pipe, and a thermoelectric module 44 disposed between the thermal conduction trough 42 and the thermal conduction device 43. The absorber 41 is a hollow spherical chamber, the thermal conduction trough 42 at the top of the absorber 41 is filled with a heat transfer medium and is connected to either the hot end of the thermoelectric module 44 or the thermal conduction device 43, and when the thermoelectric module 44 is equipped, the thermal conduction device 43 is connected to the cold end of the thermoelectric module 44. When the light rays L are refracted through the lens 12 and enter the housing 10, they are repeatedly reflected and absorbed in the absorber 41, thereby generating thermal energy. This thermal energy is then transferred through the heat transfer medium to the thermoelectric module 44 or the thermal conduction device 43, which conducts the thermal energy to the thermal energy storage tank 32 or external facilities. This not only effectively utilizes the thermoelectric module 44 for power generation, but also transfers the waste heat from the thermoelectric module 44 to the thermal energy storage tank 32 or external facilities, thereby improving energy efficiency. In other embodiments, the solar collector 30 is not limited to the aforementioned structure and may be any form of solar collector.

Referring to FIGS. 7 and 8, which illustrate the fourth and fifth embodiments of the present invention. In these embodiments, the housing 10 is a rectangular enclosure with a multi-axis adjustment device 151 mounted on the base 15 and positioned corresponding to the center of gravity of the housing 10 (i.e., the intersection of the diagonal lines), thereby facilitating the adjustment of the angle of the housing 10. In addition, four liquid-level counterbalance devices 70 are installed at the four corners inside the housing 10, and the liquid-level counterbalance device 70 is a water tank. As the sun rises in the east and sets in the west, the liquid-level counterbalance devices 70 are used in conjunction with the multi-axis adjustment device 151 to fully collect the sunlight. By individually controlling the liquid level in each water tank according to the position of the sun, the housing 10 can be oriented at different angles. For example, when the sun is shining from the right side of the housing 10, the liquid level in the two water tanks on the right side of the housing 10 is controlled to be greater than the liquid level in the two water tanks on the left side, causing the housing 10 to tilt to the right. This allows the upper surface of the housing 10 to face the position of the sun to fully collect sunlight and achieve a sun-tracking effect. In other embodiments, the number of liquid-level counterbalance devices 70 can be two, installed at the midpoints of the two lengths or the two widths of the interior of the housing 10 to achieve the same effect of orienting the upper surface of the housing 10 toward the position of the sun. In addition, the housing 10 may also be other symmetrical geometric structures.

Figure 9:
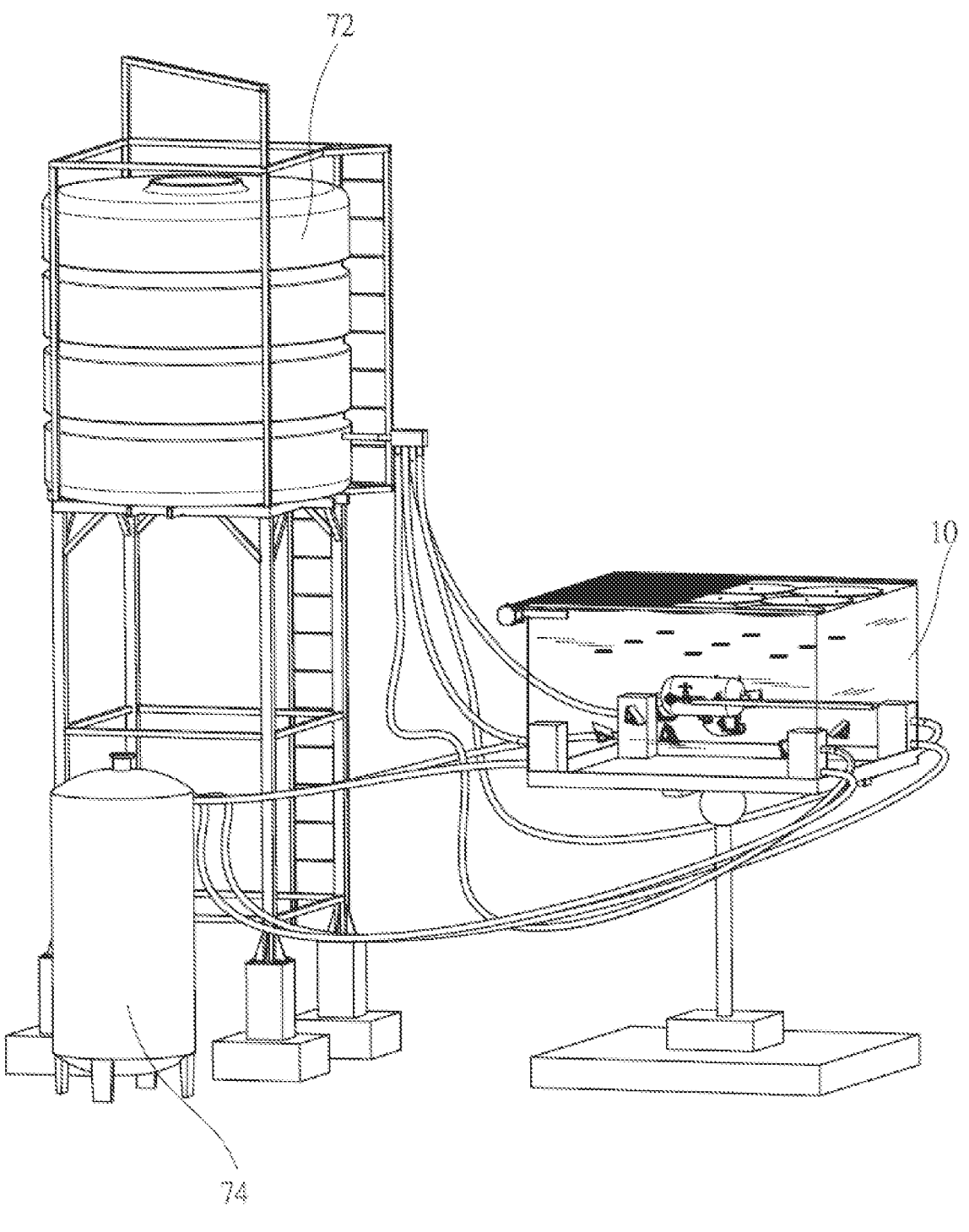
FIG. 9 is a schematic diagram of a sixth embodiment of the present invention.

Referring to FIG. 9, which illustrates a sixth embodiment of the present invention. In this embodiment, the liquid-level counterbalance device 70 also includes a liquid-level adjustment controller. The liquid-level counterbalance device 70 is connected to an external water source 72 and a liquid storage tank 74. The liquid-level adjustment controller is used to control the inflow and outflow of liquid in the water tank, introducing liquid from the external water source 72 into the water tank or discharging liquid from the water tank into the liquid storage tank 74 for resource reuse, thereby controlling the tilt angle of the housing 10 to achieve the sun-tracking effect.

By using the water pressure from the external water source 72 and the liquid-level adjustment controller to control the liquid level in the water tanks, the tilt angle of the housing 10 can be adjusted to achieve the sun-tracking function without using a power motor and saving energy consumption. Moreover, after sunset, the adjustment controller can be controlled to drain some of the liquid from the water tanks to allow the housing 10 to return to its initial morning position.

The present invention achieves a miniaturized and high-sunlight-utilization solar energy storage and power generation system by mounting the housing 10 on the base 15 having the multi-axis adjustment device 151, using the liquid-level adjustment controller to control the liquid volume in the liquid-level counterbalance devices 70, and incorporating the high efficiency light-collecting solar collector, thereby controlling the orientation of the upper surface of the housing 10 toward the position of the sun for sun-tracking.

The invention claimed is:

1. A solar energy storage and generation system, comprising:
   a housing mounted on a base;
   a solar collector installed inside the housing; and
   at least one lens installed on the upper surface of the housing,
   wherein the housing is a hollow body having multiple liquid-level counterbalance devices separately installed at different corner positions inside the housing,
   wherein the solar energy storage and generation system further comprising at least one light path mechanism correspondingly disposed between the at least one lens and the solar collector for collecting light incident on the at least one lens,
   wherein the solar collector includes an absorber connected to a thermal energy storage tank, the absorber having an inner surface with an absorbing layer,
   wherein light is reflected within the absorber and converted into thermal energy by the absorbing layer, and the thermal energy heats and evaporates a liquid stored in the thermal energy storage tank, and
   wherein the interior of the housing is a vacuum chamber.

2. The solar energy storage and generation system according to claim 1, wherein the light path mechanism is a light guide mirror assembly or a light guide tube assembly.

3. The solar energy storage and generation system according to claim 1, further comprising a multi-axis adjustment device mounted on the base and corresponding to the center of gravity of the housing.

4. The solar energy storage and generation system according to claim 1, wherein the thermal energy storage tank is installed inside the housing and connected to a thermal conduction device of the solar collector, the thermal energy storage tank having an outlet pipe and an inlet pipe penetrating through a side surface of the housing.

5. The solar energy storage and generation system according to claim 1, wherein the liquid-level counterbalance device has a liquid-level adjustment controller for introducing liquid from an external water source into the liquid-level counterbalance device or discharging liquid from the liquid-level counterbalance device into a liquid storage tank.

6. The solar energy storage and generation system according to claim 1, further comprising a retractable shade installed on the housing for covering the upper surface of the housing.

7. The solar energy storage and generation system according to claim 6, further comprising a cleaning device installed between the retractable shade and the housing.

8. The solar energy storage and generation system according to claim 1, wherein the absorber is a hollow chamber.

* * * * *

8